(12) United States Patent
Howson

(10) Patent No.: US 6,809,730 B2
(45) Date of Patent: Oct. 26, 2004

(54) DEPTH BASED BLENDING FOR 3D GRAPHICS SYSTEMS

(75) Inventor: John William Howson, Herts (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 10/367,058

(22) Filed: Feb. 14, 2003

(65) Prior Publication Data
US 2003/0122823 A1 Jul. 3, 2003

Related U.S. Application Data

(63) Continuation of application No. 09/662,946, filed on Sep. 15, 2000, now abandoned.

(30) Foreign Application Priority Data

Sep. 17, 1999 (GB) .............................................. 9922081

(51) Int. Cl.[7] .............................................. G06T 15/00
(52) U.S. Cl. ...................................................... 345/426
(58) Field of Search ................................ 345/419, 422, 345/629, 634, 420, 421

(56) References Cited

U.S. PATENT DOCUMENTS

| | | | | |
|---|---|---|---|---|
| 5,266,941 | A | 11/1993 | Akeley et al. ............... | 345/536 |
| 5,724,561 | A | 3/1998 | Tarolli et al. ................ | 345/419 |
| 5,805,868 | A | 9/1998 | Murphy ........................ | 345/519 |
| 5,831,620 | A | 11/1998 | Kichury, Jr. ................. | 345/419 |
| 6,016,151 | A | 1/2000 | Lin ............................. | 345/422 |
| 6,166,743 | A | * 12/2000 | Tanaka ........................ | 345/422 |
| 6,266,068 | B1 | * 7/2001 | Kang et al. .................. | 345/629 |
| 6,466,207 | B1 | * 10/2002 | Gortler et al. ............... | 345/427 |

FOREIGN PATENT DOCUMENTS

| | | |
|---|---|---|
| EP | 0 527 587 A2 | 2/1993 |
| EP | 0 731 424 A1 | 9/1996 |
| GB | 2281682 A | 3/1995 |

OTHER PUBLICATIONS

Schneider, B–O, et al, " M–Buffer: A Flexible MISD Architecture for Advanced Graphics", Computers and Graphics, GB, Pergamon Press, Ltd., Oxford, vol. 19, No. 2, Mar. 1995 (entire document).

Mammen, Abraham, "Transparency and Antialiasing Algorithms Implemented with the Virtual Pixel Maps Technique", *IEEE Computer Graphics and Applications*, vol. 9, No. 4, pp. 43–55, Jul. 1989 (2 pages).

"Glossary of 3D Definitions", www.3dgaming.com (9 pages), 1999.

* cited by examiner

*Primary Examiner*—Phu K. Nguyen
(74) *Attorney, Agent, or Firm*—Flynn, Thiel, Boutell & Tanis, P.C.

(57) ABSTRACT

Three dimensional computer graphic images are shaded by first supplying data which defines the objects to be inserted into the image, this data including depth data relating to the objects. A depth store (4) includes data for objects already inserted into the image and a depth comparison unit (6) compares the depth of an object to be inserted with the currently stored depth data for a particular pixel. The result of this is used to determine which of a number of depth operations is to be applied to the depth store (4). A blending value is selected for each pixel for combining the object with the image in dependence on the selected depth operation. A combining unit then combines the object with the image in proportions dependent upon the selecting blending value.

14 Claims, 1 Drawing Sheet

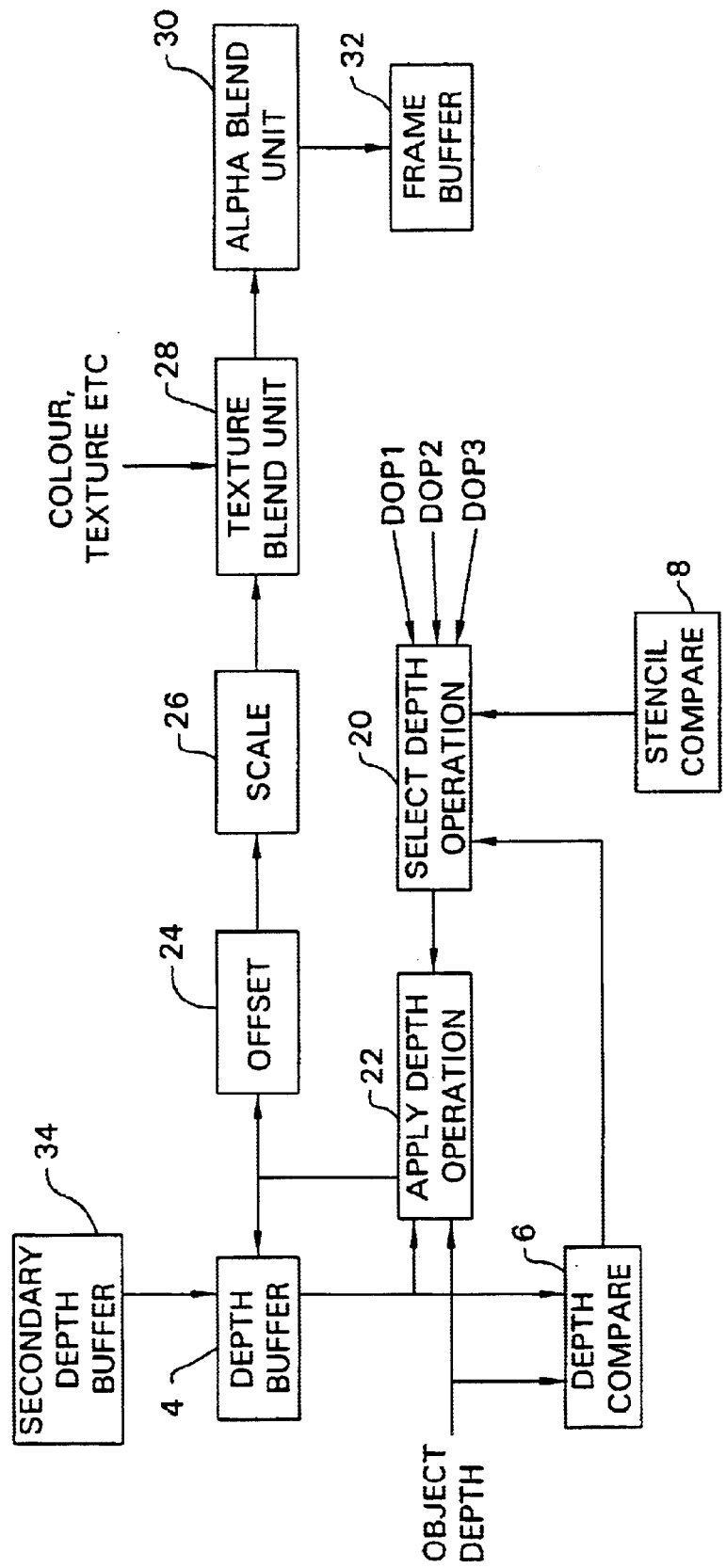

DEPTH BASED BLENDING FOR 3D GRAPHICS SYSTEMS

This application is a continuation of application Ser. No. 09/662 946, filed Sep. 15, 2000, now abandoned.

FIELD OF THE INVENTION

This invention relates to a method and apparatus for shading and texturing three dimensional computer generated graphic images and in particular to methods and apparatus which generate so called "volumetric" effects through the use of depth based blending. For example a cloud, where the degree to which the cloud or any object contained partially or fully within is visible, is dependent on how much of the cloud a ray cast from the eye must pass through before either exiting the cloud or "impacting" another object.

BACKGROUND OF THE INVENTION

Software blending of volumes can be derived from the distance between the volume's front vertices and its back faces, or an object that lies between them. This is achieved by casting a ray through each front facing vertex, and determining the distance it travels before impacting either a back face of the volume or an object contained within. This distance can then be used as an alpha value for the vertex which the ray was cast through. These per vertex blend factors can then be interpolated across the surfaces of the volume. However, as the blend factors are calculated per vertex any irregularities that occur in between them will not be taken into account. Thus, to accurately render a scene, the volume objects must contain a large number of vertices, or, in the extreme case, a vertex per screen pixel that is covered by the volume. This large number of vertices coupled with the fact that a ray must be cast through and tested against a large number of other object faces make this technique extremely inefficient.

Most 3D graphic systems operate by using the well known technique of Z or depth buffering. Objects to be rendered into a scene have depth values associated with them which can be used to derive a depth value for each pixel intersected by the object. These are compared with the current depth values in the depth buffer for each pixel. If an object is found to be in front of the current stored depth a new value can be overwritten into the depth buffer.

Many 3D graphics systems also use the well known technique of stencil buffering. This technique utilises a second parallel buffer that will typically contain between one and eight bits per pixel. When an object is to be written into a scene, in addition to the depth buffer comparison summarised above, a stencil buffer comparison with the current stencil buffer value is made for each pixel and a new stencil buffer value may be written. This comparison is used to select one of a set of stencil operations which are performed on the stencil buffer. These are designated as follows:

SOP1=stencil test fails,
SOP2=stencil test passes and depth test fails,
SOP3=stencil and depth tests both pass.

Thus, if the stencil test passes and the depth test fails, operation SOP2 will be assigned to the stencil buffers. Examples of the operations which can be assigned to SOP1, SOP2 and SOP3 are as follows:

Keep=keep Stencil value,
zero=replace stencil value with zero,
Replace=replace stencil value with reference value,
INCRSAT=increment stencil with clamping at a maximum value,
DECRSAT=decrement stencil with clamping at a minimum value,
Invert=invert stencil value,
INCR=increment stencil value,
DECR=decrement stencil value.

Thus, each object in the supplied object list will have a particular set of functions assigned to SOP1, SOP2 and SOP3. The object stencil value and the value within the stencil buffer are then combined using the selected operation in dependence on the stencil and depth tests. The result is then written back to the stencil buffer. The depth is subsequently only updated if both the stencil and depth buffer test succeed.

SUMMARY OF THE INVENTION

A preferred embodiment of the present invention provides a method and apparatus, which are able to implement volumetric effects, such as forming clouds, efficiently. To do this it provides a set of depth buffer operations which allow depth values to be manipulated arithmetically. These operations allow a depth or blending value to be formed that can be representative of the distance between the front and back of the volume. After derivation, these values can be passed to a texture blending unit in which they can be used to blend other components such as iterated colours, textures, or any other source applicable to texture blending. The result from the texture blending unit can then be alpha blended with the current contents of the frame buffer.

BRIEF DESCRIPTION OF THE DRAWINGS

A preferred embodiment of the invention will now be described in detail, by way of example, with reference to the single figure, FIG. 1 which is a block diagram of an embodiment of the invention.

DETAILED DESCRIPTION

FIG. 1 illustrates an example of how depth based blending can be implemented. A stencil buffer which will provide the result of the stencil test to this circuit is not shown. This, however, will be standard stencil buffer circuitry which will be familiar to those skilled in the art with an extra output from the stencil comparison unit 8 feeding into the select depth operation unit 20 in the figure. This circuit solves the problem faced with current hardware in which operations applied to the depth buffer are restricted to simple keep or replace operations based on success or failure of the depth and stencil comparison. This embodiment of the invention seeks to increase the number of different operations which can be performed on the depth buffer thereby increasing the number of effects which can be applied.

This is achieved by the use of a select depth operation unit 20, responsive to the results of the depth comparison in unit 6 and the stencil comparison in stencil comparison unit 8, to select one of three operations DOP1, DOP2, DOP3. These may each have one of typically 8 different operations assigned to them for each object. The list could be longer than 8.

The operations would be selected as follows:

DOP1=stencil test fails,
DOP2=stencil test passes and depth test fails,
DOP3=stencil and depth tests both pass.

Each of these will have assigned to it one of the following depth buffer operations:

Keep=current depth,
Zero=set depth buffer to zero,
max=set depth buffer to its maximum value,
Replace=replace depth buffer value with object depth,
Add=add object depth to depth buffer value,
Subtract=subtract depth buffer value from object depth,
Reverse subtract=subtract object depth from depth buffer value.

Note that all arithmetic operations will saturate at one and zero.

Because arithmetic operations on the depth buffer are permitted, using this system it becomes possible to construct pixel specific values that reflect the distance between objects within the depth plane. These values can be used, after modification, as alpha values for a blend.

In the figures the depth compare unit 6 compares an object depth from the object list with the current depth stored in the depth buffer 4 for a particular pixel and outputs the result to the select depth operation unit 20. Depth operation unit 20 also receives the result of the stencil comparison unit 8. In response to the two input values, one of the operations DOP1, DOP2 and DOP3 is selected by the depth operation unit 20.

The selected operation will be applied in an apply depth operation unit 22 which receives the same input as the depth comparison unit 6. Apply depth operation unit 22 is thus able to combine the object depth and depth buffer value using the selected operation. This output can be written into the depth buffer 4. If necessary, a write enable line (not illustrated) will be provided to the depth buffer for this.

The range of values to be supplied by the depth buffer 4 is defined to be in the range zero to one. However, depth based blending effects require a range of depth values which correspond to the full, or some fraction of, the range of alpha blend values, again zero to one, and this may not cover the full depth buffer range. For example, a cloud could occupy a small range of depth values although the required blending affect might require a full range of alpha values. In order to overcome this problem, the depth value used must be (a) offset such that its base value lies at zero, and (b) scaled such that its maximum value lies at either one or the required maximum. This operation comprises:

$$DepthAlpha=(Depth+Offset) \times Scale.$$

The addition of the offset should be signed and should saturate at zero and one. The scale should be unsigned and should saturate at one.

These operations are performed in the offset and scale units numbered 24 and 26 respectively in FIG. 1. The depth and scale values are controlled by parameters associated with the object list in a well known manner.

Once the alpha value for the texture blend has been derived, it is then combined with colour or texture in a texture blend unit 28. This allows the depth value to be modified by the full range of texture blending operations. For example, the depth alpha value could be modulated against a texture that represents the "density" of the volume, resulting in an alpha value which may vary per pixel in relation to both depth and the applied texture. The result is then used in alpha blend unit 30 to combine the new object with the current contents of the frame buffer 32 as appropriate.

The system is not limited to the use of three depth buffer operations (DOP1, DOP2, DOP3). With both stencil and depth test comparisons being used to generate selection bits, a total of four operations could be used. Alternatively if only a single bit from the depth buffer was used, a choice between two operations could be made.

An example of use of the invention is now described for rendering a cloud into a scene to be displayed. Objects of this type, to which a depth dependent alpha are applied, will be rendered into a scene after all other objects.

A cloud is formed from a convex mesh of polygons which is split by the 3D graphics system into front and back facing faces in a well known manner. The back faces of the mesh are first rendered by assigning to the depth selection unit 20 in the figure the three alternative functions as follows:

DOP1=keep value of depth buffer
DOP2=keep value of depth buffer
DOP3=replace value in depth buffer This results in well known depth buffer behavior. That is to say, the depth buffer is up-dated if the cloud polygons lie in front of the current depth. These polygons are not required to up-date the frame buffer as their visibility would depend on the front half of the cloud which will later be rendered into the frame buffer. To achieve this a null alpha blend mode is set up such that no blending takes place. As no blending is being performed the scale and offset values need not be set.

After this, the front faces of the polygons of the cloud are rendered with the following depth operations set up as inputs to select depth operation unit 20:

DOP1=zero depth buffer value
DOP2=zero depth buffer value
DOP3=Subtract depth buffer value from current depth This will result in either a value of zero being generated from the depth buffer or the distance between the front faces of the polygons and either the back faces, or any object that lies between them being a generated by the subtract operation. The value generated can then be scaled such that pixels that have a maximum value result in the required maximum alpha value. Any pixel that has no distance between front and back polygon faces results in the value of zero so no offset need be applied, i.e. it is set to zero.

The result of the scaling and offset units 24 and 26 is then applied to the texture blend unit 28. This can be set up such that the depth alpha value is multiplied by the alpha of a texture that is mapped onto the front facing polygons of the cloud. The texture may contain any image that the application requires. In this particular example the colour channels would represent the detail of the cloud surface and the alpha channel would represent the clouds density. As a result, an alpha value is generated that is not only proportional to the distance between the front and back of the cloud but is also proportionate to the alpha channel of the cloud texture.

The result from the texture blending unit 28 can now be passed to the alpha blending unit 30 where an alpha blend with the current contents of the frame buffer is performed in a well known manner. The blend function required will be a linear blend between the frame buffer values and those of the "modulated" text. As a result, the frame buffer images are obscured by the cloud texture in a manner which is proportional to the thickness and density of the cloud. For example, where the cloud is thin or has a low density the original contents of the frame buffer will predominate and where the cloud is thick or has a high density the cloud will predominate. Thus, the result of the subtraction between the front surface of the cloud and its rear surface, or the surface of an intermediate object controls the alpha value selected.

In a further embodiment, a secondary depth buffer 34 may be used to allow the original depth values from the frame buffer to be retained. This can be useful in situations such as when multiple intersecting volumes are to be rendered.

It will be appreciated that DOP1 & DOP2 select the same operation. It is therefore apparent that the selection is being made on the basis of passing or failing of the depth test. Therefore, a simplified embodiment would dispense with the stencil test as a selection input.

A further embodiment allows the volumes to be processed as monolithic objects. As the volume would be presented as a "whole" it is possible to handle multiple per pixel entries and exits to/from the volume, as such concave volumes can be handled. Also, as the object would be represented as a volume, no destructive write to the depth buffer is required.

This improvement can be implemented in any standard graphics system and it is hoped that it will be included in the Microsoft Direct 3D Immediate Mode System for Writing 3D Graphics and will thus enable software to be written to configure a standard computer to embody the invention.

What is claimed is:

1. An apparatus for shading a three-dimensional computer graphic image comprising:
   a) means for supplying data defining objects to be inserted into the image for each pixel in the image, the data including depth data relating to the object;
   b) means for storing depth data for objects already inserted into the image for each pixel in the image;
   c) means for comparing the depth data for an object to be inserted with currently stored depth data for a pixel, at each pixel covered by the object to be inserted into the image;
   d) means for selecting a depth operation to be applied to the depth data for the object and the stored depth data in dependence on the result of the comparison;
   e) means for applying the selected depth operation to the depth data for the object and to the stored depth data;
   f) means for selecting a blending value, for each pixel for combining the object with the image, in dependence on the result of the comparison between the depth data for the object and the stored depth data for the pixel;
   g) means for combining the selected blending value with a blending value for the object to be inserted into the image for each pixel to produce a combined blending value; and
   h) means for combining the object with the image in proportions dependent upon the combined blending value for each pixel.

2. The apparatus of claim 1, wherein the object being shaded is of variable translucency and the means for selecting a blending value selects the blending value as a function of the translucency of the object at the pixel.

3. The apparatus of claim 2, wherein:
   the translucent object for which said means for selecting a blending value selects the blending value is first divided into front and rear facing portions;
   the rear facing portion is initially supplied to said depth comparison means and said depth operation selecting means updates the depth data in said depth storing means if the rear facing surface is closer to the eye than a currently stored surface in said depth storage means;
   the front facing surface is then supplied to said depth storing means and said depth operation selection means updates the depth data in said depth store means again with the result of a subtraction of the currently stored depth from the depth of the front facing surface; and
   said means for selecting a blending valve, as a function of the updated depth data in said depth store means, generates the selected blending value.

4. The apparatus of claim 3, wherein said means for selecting a blending value is configured to generate said selected blending value so that the blending value is proportional to the updated depth data in said depth store means.

5. The apparatus of claim 1, further including means to apply an offset and a scaling function to the selected blending value.

6. The apparatus of claim 1, wherein:
   a means for comparing a stencil buffer value for a pixel with a stencil value for the object is provided;
   a means for selecting a stencil operation in dependence on the result of the comparison performed by said means for comparing the stencil buffer value is provided; and
   said means for selecting a depth operation to be applied on the depth data determines the depth operation to be performed on the object and the stored depth data as a function of both the comparison performed by both said means for comparing depth data for the object with the stored depth data for the pixel and the comparison performed by said means for comparing a stencil buffer value for the pixel with a stencil value for the object.

7. The apparatus of claim 1, further including a secondary depth buffer to return the original depth buffer values for use in further operations.

8. A method for shading a three-dimensional computer graphic image, said method comprising the steps of:
   a) supplying data defining an object to be inserted into the image for each pixel in the image, the data including depth data relating to the object;
   b) storing depth data for objects already inserted into the image for each pixel in the image;
   c) comparing the depth data for the object to be inserted into the image with the currently stored depth data for a pixel, at each pixel covered by the object to be inserted into the image;
   d) selecting a depth operation to be applied to the depth data for the object and the stored depth data for the pixel as a result of said depth data comparison;
   e) performing the selected depth operation to the depth data for the object and to the stored depth data for the pixel;
   f) selecting a blending value for the pixel for combining the object with the image as a result of the depth data comparison;
   g) combining the selected blending value with a blending value for the object to be inserted into the image for each pixel to produce a combined blending value for the pixel; and
   h) at the pixel, combining the object with the image in a proportion that is a function of the combined blending value for the pixel.

9. A method for shading and texturing three-dimensional computer graphic images comprising the steps of:
   providing a depth buffer in which a depth value for each pixel in the image is stored;
   supplying data defining an object to be shaded and textured into a scene;
   performing a depth comparison for each pixel covered by the object with existing objects in the scene;
   performing a stencil buffer comparison with a current stencil buffer value for each pixel covered by each object;
   selecting a depth operation to perform on the data defining the object to be inserted into the scene in dependence on the result of said depth comparison; and performing the selected depth operation on the depth value for each pixel stored in the depth buffer covered by the object to update the depth value for the pixel.

10. The method for shading and texturing a three-dimensional computer graphics image of claim 9, wherein:

after said step of performing the selected depth operation on the depth value stored for the pixel covered by the object is performed, generating an alpha value for the object at the pixel based on the depth value; and combining colour or texture for the object at with a current colour or texture for the image at the pixel based on the alpha value.

11. The method for shading and texturing a three-dimensional computer graphics image of claim 10, wherein, in said step of selecting a depth operation to perform on the data defining the object to be inserted into the scene, said selection is further dependent on the result of said stencil buffer comparison.

12. The method for shading and texturing a three-dimensional computer graphics image of claim 9, wherein:

an object is defined as a polygon having front and back facing faces;

a first said step of performing a depth comparison is performed on the back facing face of the object-defining polygon;

a first said step of selecting the depth operation to perform on the data defining the object to be inserted into the scene is performed in dependence of the result of said step of performing a depth comparison on the back facing face of the object-defining polygon, wherein the selected depth operation is from a first set of possible depth operations;

a first said step of performing the selected depth operation on the data defining the object to be inserted in the scene is performed using the depth operation selected in said first step of selecting the depth operation;

a second said step of performing a depth comparison is performed on the front facing face of the object-defining polygon;

a second said step of selecting the depth operation to perform on the data defining the object to be inserted into the scene is performed in dependence of the result of said step of performing a depth comparison on the front facing face of the object-defining polygon, wherein the selected depth operation comes from a second set of possible depth operations, the second set of possible depth operations being different from the first set of possible depth operations; and a second said step of performing the selected depth operation on the data defining the object to be inserted in the scene is performed using the depth operation selected in said second step of selecting the depth operation.

13. The method for shading and texturing a three-dimensional computer graphics image of claim 12, wherein, in said step of selecting a depth operation to perform on the data defining the object to be inserted into the scene, said selection is further dependent on the result of said stencil buffer comparison.

14. The method for shading and texturing a three-dimensional computer graphics image of claim 9, wherein, in said step of selecting a depth operation to perform on the data defining the object to be inserted into the scene, said selection is further dependent on the result of said stencil buffer comparison.

* * * * *